United States Patent [19]

Dimen

[11] Patent Number: 5,333,509

[45] Date of Patent: Aug. 2, 1994

[54] TENSION GAUGE

[76] Inventor: Michael Dimen, 145 W. 27th St., New York, N.Y. 10001

[21] Appl. No.: 975,395

[22] Filed: Nov. 12, 1992

[51] Int. Cl.⁵ .............................................. G01L 1/00
[52] U.S. Cl. ............................ 73/862.391; 73/862.381
[58] Field of Search .................. 73/828, 856, 862.391, 73/862.392, 858

[56] References Cited

U.S. PATENT DOCUMENTS

| | | | |
|---|---|---|---|
| 1,936,282 | 11/1933 | Zapf | 73/51 |
| 2,017,876 | 10/1935 | Tripolitis | 33/147 |
| 2,071,694 | 2/1937 | Howe | 189/31.5 |
| 2,099,662 | 11/1937 | Slonneger | 265/1 |
| 2,362,626 | 11/1944 | Giffen | 73/862.392 |
| 2,376,037 | 5/1945 | Davies et al. | 73/143 |
| 2,376,038 | 5/1945 | Dawson | 33/147 |
| 2,382,351 | 8/1945 | Thorpe | 73/862.392 |
| 2,387,737 | 7/1945 | Black | 73/143 |
| 2,393,053 | 1/1946 | Moore | 73/862.392 |
| 3,436,962 | 4/1969 | Laws | 73/862.392 |
| 3,864,953 | 2/1975 | Fletcher et al. | 73/143 |
| 3,958,455 | 5/1976 | Russell | 73/862.392 |
| 4,128,918 | 12/1978 | Wenk | 24/16 R |
| 4,348,907 | 9/1982 | Giese | 73/862.392 |
| 4,562,743 | 1/1986 | Bonine | 73/828 |
| 4,815,408 | 3/1989 | Burd | 114/109 |

OTHER PUBLICATIONS

Instruction Manual, Selden Masts, Sweden, p. 5, No date.
Catalog of Tables, Data and Helpful Information, Mac-Whyte Wire Rope Company, Kenosha, WI 53141, pp. 59, 168-169.

*Primary Examiner*—Richard E. Chilcot, Jr.
*Assistant Examiner*—R. Biegel
*Attorney, Agent, or Firm*—David M. Klein

[57] ABSTRACT

An elongation or tension gauge for adjusting sailboat rigging comprising a measuring stick 12 including registration cutout 18 and indicia 8, attached to a pair of nylon or plastic clips 14U (UPPER) and 14L (LOWER) each comprising jaws 20, a clip shoulder 22, a clip reference edge 24, and a clip arm 26.

16 Claims, 3 Drawing Sheets

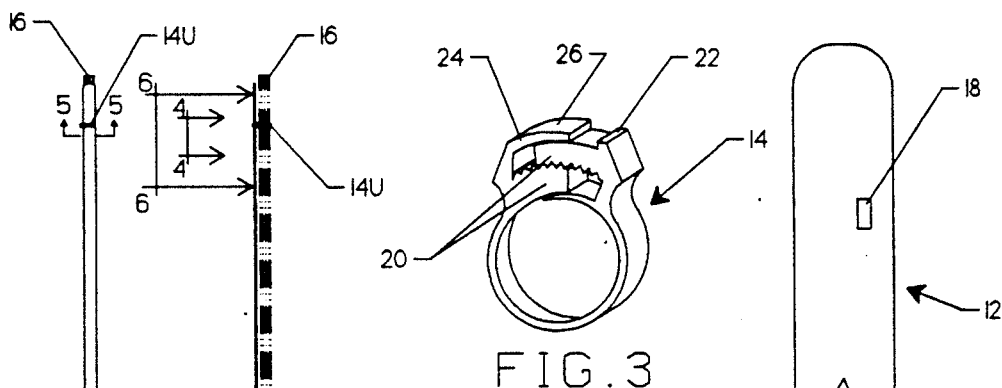
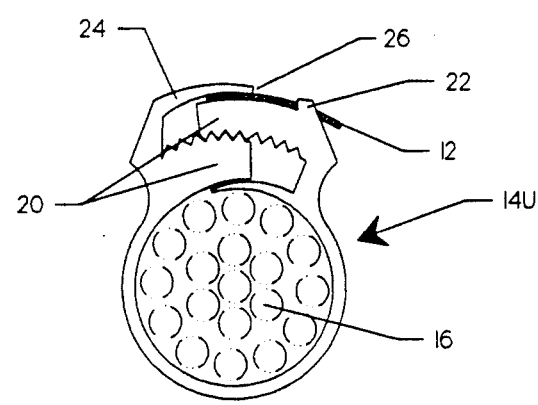
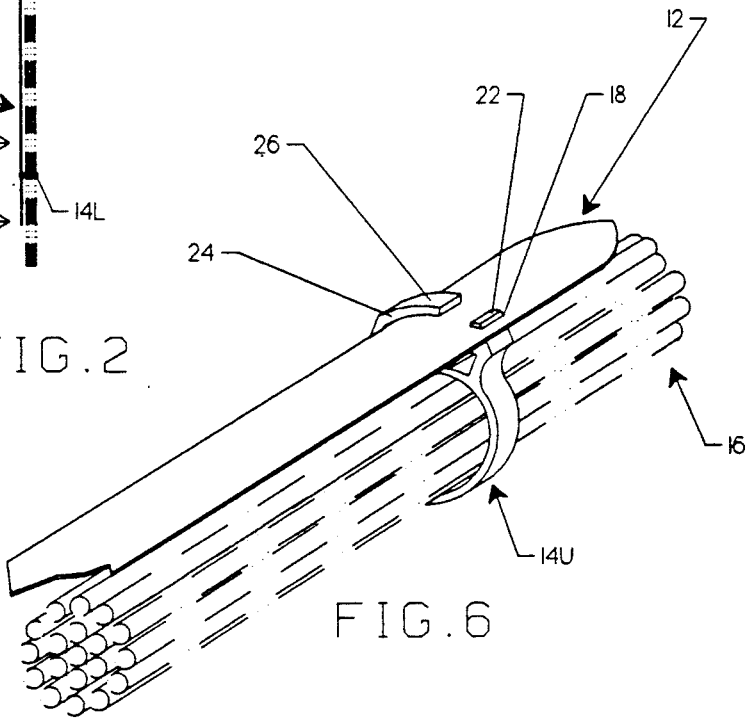
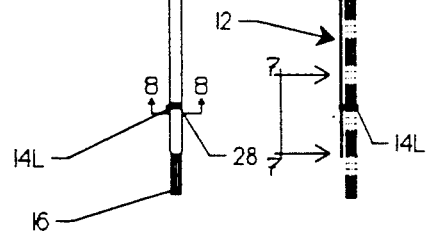
FIG.1  FIG.2

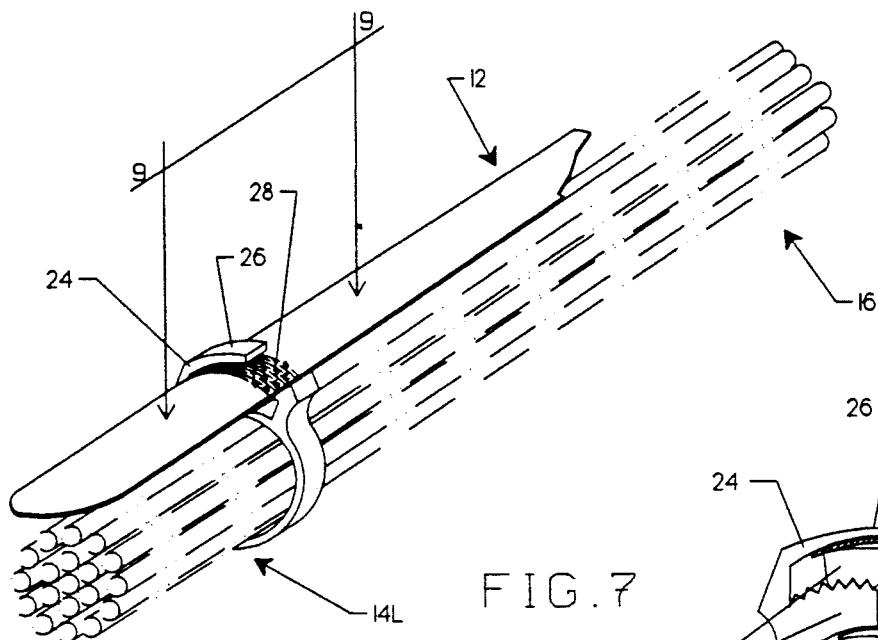
FIG.7
FIG.8
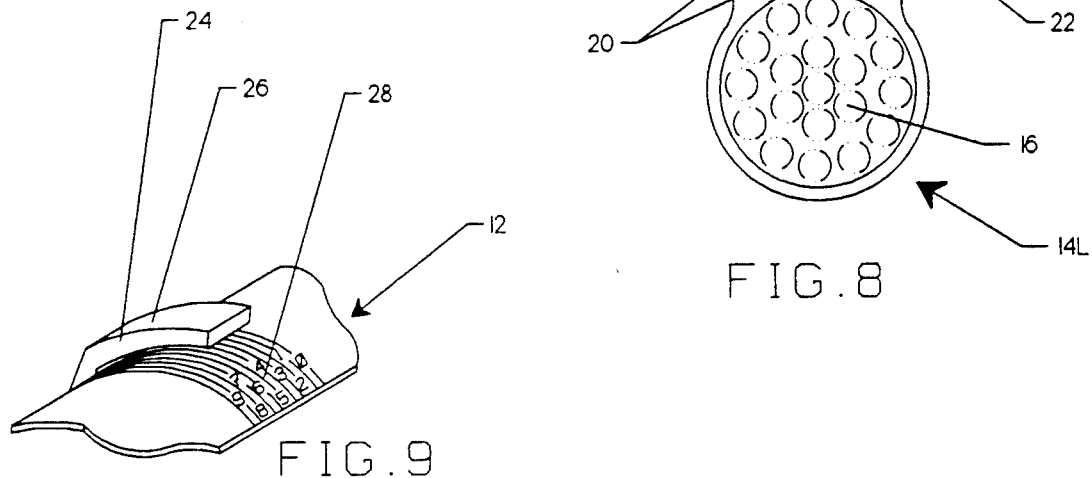
FIG.9
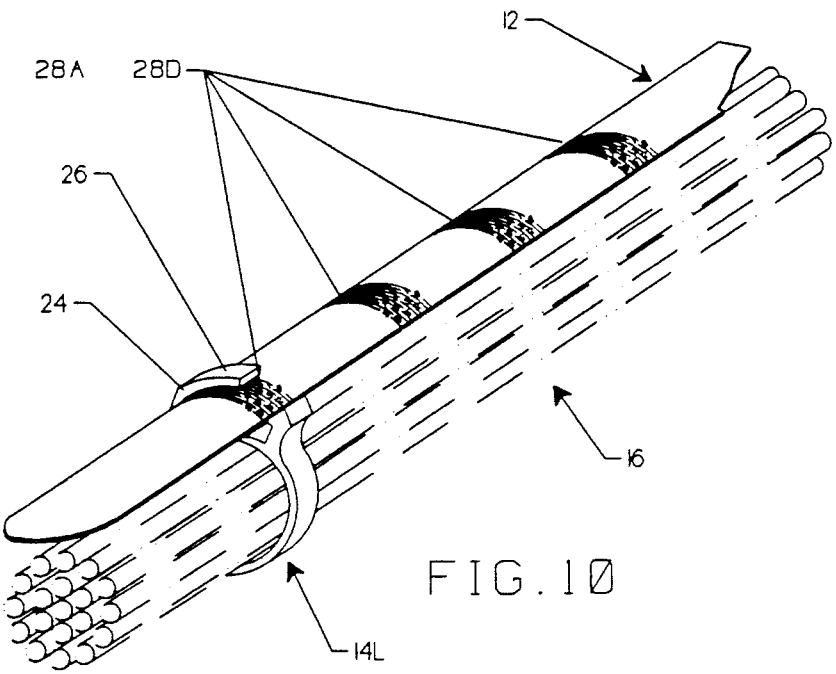
FIG.10

TENSION GAUGE

FIELD OF INVENTION

This invention relates to an improved gauge for measuring tension in sailboat rigging, as a means of keeping the mast in proper alignment and support.

BACKGROUND AND DESCRIPTION OF PRIOR ART

Typically, the masts of sailing vessels are supported in a generally vertical position by several shrouds or stays which are connected to the deck. These stays are made of metal, fiber, or plastic rod, or of cables made of strands of wire. In order to rig a vessel properly, these stays should be placed in a predetermined tension. Shrouds or stays on smaller sailing vessels are frequently tensioned in an empirical manner when a vessel is rerigged or tuned, or when an individual stay is replaced. The person making the replacement or adjustment may resort to feeling the stay's give or movement to gauge whether it is tight or loose enough, or to match the tension of an opposing stay. As this is a very subjective method, the results are not always optimal. It is often necessary to resort to a back-and-forth method of adjusting one stay, then its opposite, then returning to the first, then returning to the second, again and again until what is felt to be the optimum tension is achieved. This subjective method can result in unequal loading on the mast. This can also result in a mast which is too tightly or too loosely held in position, and thus fail to optimize the sailing characteristics of the vessel. In addition, if such an operation is not carried out with great care, the stay can be stressed beyond its elastic limit, and will then not return to its former length when relaxed. In addition, it may be susceptible to breakage. Such overstressing can damage mounting and termination fittings.

Tensiometers and the like have long been used to measure the tension of sailboat shrouds and stays. Many such devices measure the effort required to deflect a stay under tension a predetermined amount, or measure the extent of deflection caused by a predetermined eccentric load applied to a tensioned stay.

Other devices such as electrical strain gauges are placed in line with shrouds or stays. The variable resistance is measured and displayed on appropriate electronic units.

Certain devices measure the tension in a cable or rod as a function of elongation. It is well known that elastic elements such as sailboat rigging stays will elongate according to the formula $$\Delta L = LT/EA$$

where
$\Delta L$ = Elongation of tensioned element
$T$ = Tension
$L$ = Length
$E$ = Elastic modulus
$A$ = Cross-sectional area of material.
By transposition, we can obtain $$L = EA\Delta L/T.$$

Values for T based upon convenient percentages of breaking strength will, in combination with unitary, convenient values for $\Delta L$, determine a single value for L for a given tensioned element.

By way of example, consider $\frac{3}{8}''$ 1×19 stainless steel wire rope, manufactured with 19 wires spirally wrapped around a single straight core wire. Such wire rope has a nominal breaking strength of 17,500 pounds, a cross-sectional area of 0.088979 square inches, and an elastic modulus of $22 \times 10^7$. A first point of measurement on a length of such wire rope 69,906" from a second point of measurement when released of all tension will be found to have moved 1/32" away from the second point for each 875 pounds of tension applied along the longitudinal axis of such rope. This 875 pounds is equal to 5% of the breaking strength of this type and size of wire rope. Thus, by constructing indicia with graduations equal to 1/32", elongations caused by a loading equivalent to 5%, 10%, etc., of breaking strength of such rope can be directly indicated if the base line of the indicia is located 69.906" from a first point of measurement. By locating these indicia a suitable distance from the fixed point of connection with the stay, the elongation of the stay can be measured and the tension generated therein directly determined.

It is therefore a general purpose of the present invention to provide an improved gauge which is simple, easily applied, and inexpensive, suited for use in measuring tension as a function of elongation of sailboat rigging stays.

OBJECTS OF THE INVENTION

Several objects and advantages of the present invention are:

(a) to provide a gauge which can be easily and inexpensively produced and secured to a tensioned element when not under load;

(b) to provide a gauge which does not require specialized anchorages or fittings pre-attached to a tensioned element;

(c) to provide a gauge which will provide continuous measurement of tension throughout the range of its scale;

(d) to provide a gauge which can be easily removed from a tensioned element when measurements are completed;

(e) to provide a gauge which can be reattached to a tensioned element to remeasure or readjust a tensioned element under load; and (f) to provide a gauge which can be transferred from one tensioned element to another, regardless of size or type of a tensioned element.

Further objects and advantages are to provide a gauge which provides a useable degree of accuracy, while being sturdy and able to withstand the shocks of casual use and storage, which can be easily stored, which is lightweight yet fairly rigid due to the nature of its construction, and of which the permanently located elements can withstand exposure to the elements. Further objects and advantages will become apparent from a consideration of the ensuing description and drawings. These and other advantages are very simply achieved through the use of a pair of nylon or plastic clips secured to a sailboat shroud or stay held under tension, and a measuring stick incorporating indicia, the measuring stick being held at an upper end by a shoulder on the upper clip of the pair, and held an a lower end by a clip arm on the lower clip.

BRIEF DESCRIPTION OF DRAWING FIGURES

FIG. 1 shows a full length frontal elevation view of a tension gauge attached to a sailboat shroud or stay.

FIG. 2 shows a full length side elevational view of a tension gauge.

FIG. 3 shows an isometric view of a nylon or plastic clip.

FIG. 4 shows a fragmented elevational view of the upper end of a tension gauge, taken generally along line 4—4 of FIG. 2.

FIG. 5 shows a sectional view of a tension gauge through an upper clip 14U, taken along line 5—5 of FIG. 1.

FIG. 6 shows a fragmented isometric view of the upper end of a tension gauge, taken generally along line 6—6 of FIG. 2.

FIG. 7 shows a fragmented view of the lower end of a tension gauge, taken generally along line 7—7 in FIG. 2.

FIG. 8 shows a sectional view of a tension gauge through a lower clip 14L, taken along line 8—8 of FIG. 1.

FIG. 9 shows an expanded view of the lower end of a tension gauge, taken generally along line 9—9 of FIG. 7.

FIG. 10 illustrates in detail a further embodiment of the lower end of a tension gauge, incorporating a plurality of sets of indicia.

DESCRIPTION OF INVENTION

Figure 11:
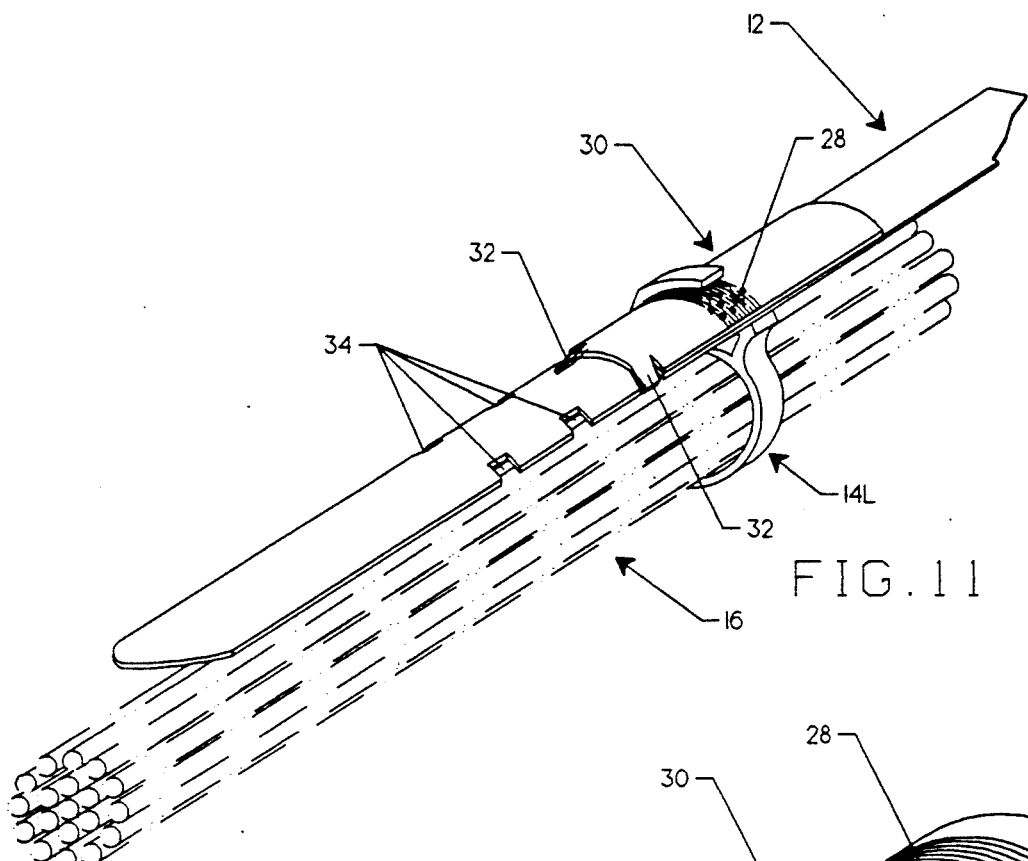
FIG. 11 shows a further embodiment of the lower end of a tension gauge, incorporating a series of attachment notches with a removable indicia panel in place.

Referring now to the drawings wherein like reference characters designate like or corresponding parts throughout the several views, there is shown FIG. 1 a device embodying the principles of the instant invention comprising a measuring stick 12 secured by a pair of nylon or plastic clips 14 to a sailboat shroud or stay 16.

It is, of course, to be understood that the utility of this device is not limited to use in the mounting and adjusting of sailboat rigging, and that the device can be employed in substantially any instance wherein the tension of a wire rope or rod having a propensity to elongate under tension is to be determined. Therefore, it is to be understood that while this device is hereinafter described as having particular utility in carrying out mounting and adjustment procedures in connection with sailboat rigging, this device can be employed quite satisfactorily for numerous similar purposes.

A preferred embodiment of the present invention is illustrated in the Drawing FIGS. 1-9.

FIG. 1 shows a tension gauge comprising measuring stick 12 attached via an upper clip 14U and a lower clip 14L to a sailboat shroud or stay 16. Measuring stick 12 is approximately 80 inches long, and is constructed of 0.0045" thick 1045 alloy steel, 0.75 inches wide, which is heat-treated and rolled with a transverse or cross curve, so that it remains straight in its extended position as a result of the tension placed in the stick by the cross curve, and coated to resist corrosion. FIG. 2 shows a side elevational view of the device shown in FIG. 1.

FIG. 3 shows an isometric view of a nylon or plastic clip 14, similar to a type described in U.S. Pat. No. 4,128,918 issued 1978 Dec. 12 to Raymond C. Wenk, including a pair of jaws 20, a clip shoulder 22, a clip reference edge 24, and a clip arm 26.

FIG. 4 shows an enlarged view of an upper end of stick 12, taken generally along line 4—4 of FIG. 2, showing rectangular registration cutout 18 which is sized to matingly engage clip shoulder 22. FIG. 5 shows a cross-sectional view, along line 5—5 in FIG. 1, of clip 14U with stick 12 matingly engaged with clip 14U via clip shoulder 22.

FIG. 6 shows an fragmented isometric view of an upper end of stick 12, taken generally along line 6—6 of FIG. Stick 12 is held to clip 14U by clip arm 26, and cutout 18 is matingly engaged with clip shoulder 22 of clip 14U. Clip 14U is tightly clamped to stay 16.

FIG. 7 shows an fragmented isometric view of a lower end of stick 12, taken generally along line 7—7 of FIG. 2. Stick 12 is slidably engaged to clip 14L via clip arm 26 of clip 14L. Clip 14L is tightly clamped to stay 16. FIG. 8 shows a cross-sectional view, along line 8—8 in FIG. 1, of clip 14L with stick 12 slidably engaged to clip 14L via clip arm 26. FIG. 9 shows an enlarged view of a portion of a lower end of stick 12 taken generally along line 9—9 of FIG. 7. Stick 12 is slidably engaged to clip 14L by clip arm 26, and reference edge 24 of clip arm 26 lies across indicia 28.

FIG. 10 is a fragmented view of a lower end of stick showing another embodiment of the present invention in which a measuring stick 12 includes on its surface a plurality of sets of indicia 28A-28D at distances from cutout 18 providing calibration for a plurality of different tensioned element sizes and types.

Figure 12:
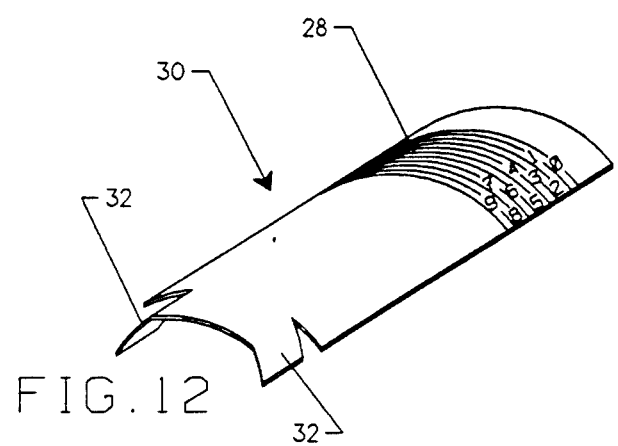
FIG. 12 shows in enlarged scale the removable indicia panel of FIG. 11.

FIG. 11 shows a further embodiment in which a set of indicia 28 is printed on a removable indicia panel 30, including mounting tabs 32, precisely attachable to stick 12 at a plurality of attachment notches 34. This would provide calibration for a plurality of stay sizes and types. FIG. 12 shows an isometric view of removable indicia panel 30 in enlarged scale.

Figure 13:
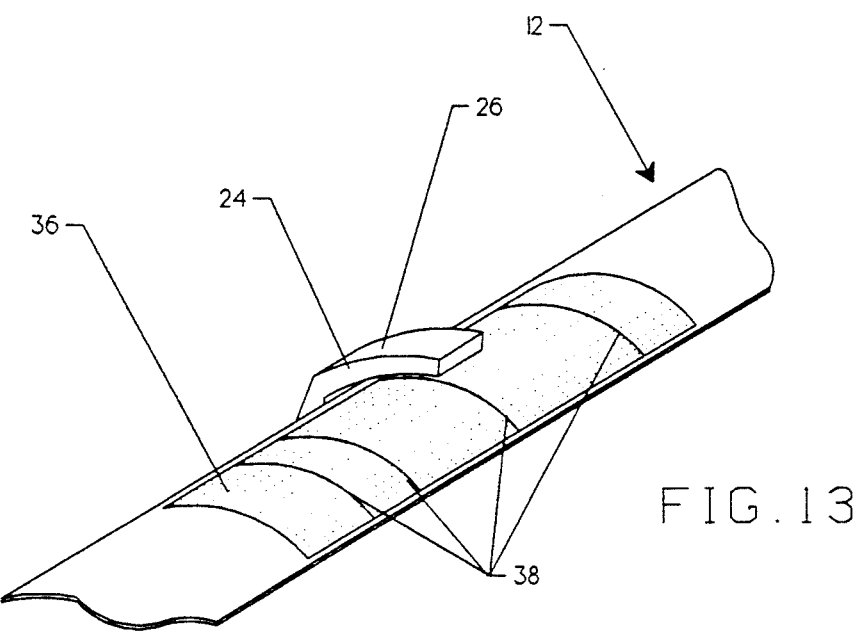
FIG. 13 shows another embodiment of the lower end of a tension gauge, showing in fragmented isometric view an applied markable surfacing.

FIG. 13 shows yet another embodiment of the present invention, in which a measuring stick 12 has a surfacing 36 applied which will accept markings 38 from a pen, pencil, or other suitable device so that desired tensions, once found, may be thereon indicated and afterwards obtained repeatedly with precision.

Other embodiments might utilize a plurality of removable panels similar to removable panel 30, which would be printed with different sets of indicia calibrated to a single point of attachment. Still other embodiments might be conceived in which dial indicators or similar indicating instruments would be attached to stick 12 to provide a precise readout of elongation of the tensioned element.

OPERATION OF INVENTION

A nylon or plastic clip 14U (UPPER), one of a first pair of such clips, is placed on a sailboat shroud or stay 16 at a distance from a lower end of stay 16 greater than the length of a measuring stick 12, prior to stay 16 being placed in tension sufficient to impart an elongation to adjacent portions thereof. Stick 12 is attached to clip 14U by slipping the upper end of stick 12 beneath a clip arm 26, and matingly engaging a rectangular registration cutout 18 with a clip shoulder 22. A second clip 14L (LOWER) of the first pair of clips is placed on stay 16 near the lower end of stick 12, and jaws 20 of clip 14L are partially engaged so as to allow clip 14L to engage slidably on stay 16. A lower end of stick 12 is slipped between a clip arm 26 and jaws 20 of clip 14L, and clip 14L is slid up or down stay 16 until a clip reference edge 24 on clip arm 26 of clip 14L aligns with the base line or zero mark of indicia 8. Clip 14L is then tightened fully, and stay 16 is placed in tension.

By placing stay 16 in tension, an elongation thereof is effected. This elongation is indicated by noting the movement of clip reference edge 24 along indicia 8 in a direction parallel to the longitudinal axis of stick 12.

This reading is proportional to the tension applied to stay 16, and can be converted into units of tension force by consulting a simply constructed table of values which provides, for each marking on indicia 8, a corresponding tension force generated in stay 16. The values for this table can be calculated using the formula for elongation given just above under the section on Background.

When the operation of measuring the tension in first stay 16 is completed, stick 12 is removed from first pair of clips 14U and 14L, and can be used to similarly measure a second shroud or stay 16 by following the same procedure described just above, using a second pair of clips 14U' and 14L'. The first pair of clips 14U and 14L, which remain secured to first stay 16, can later be used to remeasure the current tension of first stay 16 by attaching stick 12 to clips 14U and 14L in the manner described above, and noting the current alignment of reference edge 24 of clip 14L with indicia 8. This procedure can be performed without having to remove tension and therefore elongation from first stay 16.

When all operations have been completed, storage of stick 12 can be effected by simply coiling stick 12 around the hand of the operator, and placing same in a bag or box of suitable size.

In view of the foregoing, it should readily be apparent that the device of the instant invention provides a practical solution to the problem of accurately and easily adjusting sailboat rigging. Among its advantages are the following:

(a) it is produced from materials which are readily available, and can be replaceably attached and removed from operation simply;
(b) it can be secured to a shroud or stay already placed in service;
(c) it will provide continuous measurement of tension throughout the range of its scale;
(d) it can be easily transferred from one shroud or stay to another, regardless of size or type of material used in a stay; and
(e) the clips, which remain secured to a stay, are weather- and sunlight- resistant, and are of a material which is not likely to cause injury if struck by a part of the body.

Although the present invention has been herein shown and described in what is conceived to be the most practical and preferred embodiment, it is recognized that departures may be made therefrom within the scope of the invention, which is not to be limited to the illustrative details disclosed. Thus, the scope of the invention should be determined by the appended claims and their legal equivalents, rather than by the examples given.

I claim:

1. A device for measuring the tension of a cable or other linear element which comprises:

(a) a measuring stick having first and second ends, and scale indicia disposed toward the second end, the scale indicia sized for measuring the elongation of the cable;
(b) means for attaching the first end of the measuring stick to the cable in fixed longitudinal relation with the cable and substantially parallel thereto the attaching means comprising a first clip which comprises interlocking jaw means for securing the clip around the cable;
(c) measuring means attached to the cable at a distance from the attaching means, the measuring means supporting the second end in movable longitudinal relation with the cable, the measuring means comprising a reference edge which overlies the scale indicia whereby the distance between the attaching means and the measuring means will vary when the cable is elongated and cause the measuring means to move relative to the measuring stick, the distance of movement being measurable by the change in position of the reference edge relative to the scale indicia, the measuring means comprising a second clip comprising interlocking jaw means for securing the clip around the cable, and a clip arm for slidably securing the measuring stick, the measuring stick further comprising an attachment cutout disposed toward the first end, the first clip further comprising an attachment shoulder wherein the first clip is attached to the measuring stick by engaging the clip attachment shoulder with the attachment cutout.

2. The device according to claim 1 wherein the scale indicia comprises a base line or zero mark, and is situated at a distance from the attachment cutout such that, with the reference edge of the second clip being initially placed upon the zero mark of the scale indicia, the movement of the reference edge due to the elongation of the cable is proportional to the change in tension of the cable.

3. The device according to claim 2 wherein the measuring stick comprises a plurality of scale indicia, each of which is associated with a particular type of cable.

4. The device according to claim 2 wherein the distance from the base line to the attachment cutout is determined by applying the formula $$L = EA\Delta L/T$$

where
L = distance from the cutout of the stick to the base line of the indicia
E = elastic modulus of the linear element
A = cross-sectional area of the linear element
$\Delta L$ = elongation as indicated by movement of the reference means along the scale indicia
T = tension induced in the linear element.

5. The device according to claim 1 wherein the measuring stick may be rolled into a coil and comprises a curved cross-section.

6. The device according to claim 1, wherein the indicia is displayed on a removable indicia panel, the removable panel comprising means for attaching the indicia to the measuring stick.

7. The device according to claim 1 wherein the cable is selected from the group consisting of stainless steel wire rope, galvanized steel wire rope, and metal and plastic rod.

8. The device according to claim 1, wherein the scale indicia are positioned for enabling determination of the tension T created in the cable where $$T = EA\Delta L/L$$

and where
- T = tension induced in the linear element
- E = elastic modulus of the linear element
- A = cross-sectional area of the linear element
- ΔL = elongation as indicated by movement of the reference edge along the scale indicia
- L = distance from the attachment cutout of the measuring stick to the base line of the scale indicia.

9. An apparatus for indicating elongation in sailboat rigging or other linear element, which comprises:
   a) a measuring stick with a curved cross-section and which may be rolled in a coil, and further comprising a rectangular cutout near a first end, and a scale indicia near a second end, the scale indicia comprising a base line or zero mark;
   b) a first clip for fastening the first end of the measuring stick to the rigging in longitudinal alignment therewith and in fixed relation thereto; and
   c) a second clip fixed relative to the rigging for securing the second end of the measuring stick to the rigging, the measuring stick being movable relative to the rigging, the second clip comprising a reference marker in proximity to the scale indicia;
   the measuring stick comprising a plurality of scale indicia near the second end,
   each comprising a base line or zero mark, each is associated with a particular size and type of rigging, and each scale indicia is situated at a distance from said rectangular cutout such that, with the reference edge of said second clip being initially placed upon the zero mark of the appropriate scale indicia, the movement of said reference edge due to the elongation of said sailboat rigging element is proportional to the tension of said rigging;
   wherein the tension of the rigging is measurable from the movement of the reference marker with respect to the scale indicia.

10. The apparatus of claim 9, wherein the measuring stick comprises a blank panel near the second end comprising a markable means adapted to receive markings from pencil, pen, marker, or other appropriate device, each of which markings indicates a predetermined extent of elongation for comparison with the extent of elongation of the rigging.

11. A method for measuring the elongation of a cable or the like which comprises:
   a) providing a measuring stick having first and second ends, and comprising scale indicia disposed toward the second end, the scale indicia sized for measuring the elongation of the cable the measuring stick further comprising an attachment cutout disposed toward the first end;
   b) attaching the first end of the measuring stick to the cable in fixed longitudinal relation with the cable and substantially parallel thereto using an attaching means comprising a first clip which comprises interlocking jaw means and a clip attachment shoulder, the step of attaching the first end comprising placing the first clip around the cable and interlocking the jaw means around the cable, and then engaging the attachment cutout with the clip attachment shoulder of the first clip;
   c) attaching measuring means to the cable at a distance from the attaching means for aligning the measuring means with the scale indicia, the measuring means comprising a second clip comprising interlocking jaw means for securing the clip around the cable, and a second clip attachment shoulder for slidably supporting the measuring stick in movable longitudinal relation with the cable, the measuring means comprising a reference edge which overlies the scale indicia whereby the distance between the attaching means and the measurement means will vary when the cable is elongated and cause the measuring means to move relative to the measuring stick, the distance of movement being measurable by the change in position of the reference edge relative to the scale indicia, the step of attaching the measuring means comprising placing the second clip around the cable and interlocking the jaw means around the cable, and then engaging the second clip attachment shoulder with the second end of the measuring stick with the reference edge overlying the scale indicia.

12. The method according to claim 11 wherein the scale indicia comprises a base line or zero mark, and the method further comprises the step of:
   situating the base line at a distance from the attachment cutout such that, with the reference edge of the second clip being initially placed upon the zero mark of scale indicia, the movement of the reference edge due to the elongation of the cable is proportional to the change in tension of the cable.

13. The method according to claim 12 further comprising the step of determining the distance from the base line to the attachment cutout using the formula $$L = EA\Delta L/T.$$

where
- L = distance from the cutout of the stick to the base line of the indicia
- E = elastic modulus of the sailboat rigging element
- A = cross-sectional area of the sailboat rigging element
- ΔL = elongation as indicated by movement of the reference means along the scale indicia
- T = tension induced in the sailboat rigging element.

14. The method according to claim 12 further comprising the steps of:
   partially securing the second clip to the cable in order that further positional adjustment of the second clip along the cable be accommodated;
   slidably engaging the second clip shoulder with the measuring stick and aligning the clip arm with the base line; and
   fully securing the second clip to the cable with the reference edge aligned with the base line.

15. The method according to claim 11, further comprising the step of determining the tension created in the cable using the formula $$L = EA\Delta L/T.$$

where
- T = tension induced in the sailboat rigging element
- E = elastic modulus of the sailboat rigging element
- A = cross-sectional area of the sailboat rigging element ΔL = elongation as indicated by movement of the reference edge along the scale indicia L = distance from the attachment cutout of the measuring stick to the base line of the scale indicia.

16. The method according to claim 11 wherein the measuring stick is a strip having a curved cross-section which may be rolled into a coil and further comprising the step of rolling the measuring stick into a coil when the stick is not in use.

* * * * *

UNITED STATES PATENT AND TRADEMARK OFFICE
CERTIFICATE OF CORRECTION

PATENT NO. : 5,333,509
DATED : August 2, 1994
INVENTOR(S): Michael Dimen

It is certified that error appears in the above-identified patent and that said Letters Patent is hereby corrected as shown below:

Claim 15, line 4: Delete "$L=EA\Delta L/T.$", insert --$T=EA\Delta L/L$--.

Signed and Sealed this

Twenty-fifth Day of October, 1994

Attest:

BRUCE LEHMAN

Attesting Officer     Commissioner of Patents and Trademarks